United States Patent [19]

Debus, Jr. et al.

[11] Patent Number: 4,727,534
[45] Date of Patent: Feb. 23, 1988

[54] TIMING AND CARRIER RECOVERY IN DUAL POLARIZATION COMMUNICATIONS SYSTEMS

[75] Inventors: Walter Debus, Jr., Nottingham, N.H.; Mohsen Kavehrad, Holmdel, N.J.

[73] Assignees: American Telephone and Telegraph Company, New York, N.Y.; Bell Telephone Laboratories, Murray Hill, N.J.

[21] Appl. No.: 899,411

[22] Filed: Aug. 19, 1986

[51] Int. Cl.$^4$ .............................................. H04J 11/00
[52] U.S. Cl. ...................................... 370/20; 375/39; 455/60
[58] Field of Search ................. 370/20, 19, 2, 102; 455/60; 375/39; 342/361, 362, 384

[56] References Cited

U.S. PATENT DOCUMENTS

4,095,053 6/1978 Duttweiler et al. ............... 370/102
4,521,878 6/1985 Toyonaga ........................... 370/20

Primary Examiner—Douglas W. Olms
Assistant Examiner—James E. Busch
Attorney, Agent, or Firm—David R. Padnes

[57] ABSTRACT

A technique is disclosed for improving the recovery of data signals transmitted on orthogonally polarized carrier signals by creating redundancy with respect to timing and carrier information. In the receiver, the carrier and timing recovery circuitry, which controls the recovery of the data signals from the incoming orthogonally polarized carrier signals, operate in response to a selected one of the carrier signals or at least one data signal recovered from this selected carrier signal. This selection is based on an examination of the data signals recovered from each of the orthogonally polarized carrier signals. Use of the described technique advantageously lessens the possibility of the carrier and timing recovery circuits losing synchronous operation during fading as it is less likely that a fade will simultaneously affect both orthogonally polarized carrier signals. As a result, data signal recovery is improved.

12 Claims, 9 Drawing Figures

TIMING AND CARRIER RECOVERY IN DUAL POLARIZATION COMMUNICATIONS SYSTEMS

TECHNICAL FIELD

The present invention relates to the recovery of transmitted data signals in a digital communications system and, more particularly, to a technique for improving the operation of timing and carrier recovery circuitry in communications systems in which independent data signals are simultaneously transmitted on carrier signals having orthogonal polarizations.

BACKGROUND OF THE INVENTION

The burgeoning growth of terrestrial and satellite communications systems has been accompanied by the need to provide higher and higher information-carrying capacities within a limited frequency band. One of the techniques used to fulfill this need has been to simultaneously transmit independent data signals on carrier signals which have orthogonal polarizations and which occupy the allotted frequency band. This use of modulated, orthogonally-polarized carrier signals can double the information-carrying capacity of a communications link. However, time-varying distortion, such as rainfall, imperfect antenna alignment, etc., collectively known as fading, can interfere with the operation of carrier and timing recovery circuitry in the system receiver. Such circuitry is respectively used for demodulating the incoming carrier signal and then sampling the demodulated signal to reconstruct the data. At times, the fading is so severe that the carrier and timing recovery circuits are no longer synchronized to the incoming and the data signals can't be recovered.

One general class of techniques to reduce fading-induced data loss in systems which employ one or more carrier signal having a single polarization is to transmit the same data either over different line-of-sight routes or on a plurality of carrier signals having different frequencies. While these techniques, respectively known as spatial and frequency diversity, provide satisfactory results, their usage is not practical in certain applications and their cost can be prohibitive.

Other prior art attempts to minimize loss of the data signal caused by improper operation of carrier and timing recovery circuits have focussed on diminishing the acquisition time, i.e., the time required for such circuits to establish synchronization after synchronization has been lost due to severe distortion. While these attempts have been successful, there is still a loss of data during the acquisition time which exceeds the performance objectives of certain system applications.

SUMMARY OF THE INVENTION

The present invention overcomes the limitations of the prior art by utilizing common clock and carrier sources for each of the transmitted orthogonally polarized carrier signals. This creates a redundancy channel in so far as the timing and carrier information. In the system receiver, the data extracted from each of the orthogonal carrier signals is examined and, based on this examination, one of the received carrier signals, or data recovered therefrom, is used to control the regeneration of subsequent data from both of the orthogonal carrier signals. Advantageously, this data decision-directed approach, which can be applied with baseband and passband carrier and timing recovery circuits, lessens the likelihood that such circuits will lose synchronous operation as it is less likely that fading will simultaneously affect both orthogonally polarized carrier signals.

DETAILED DESCRIPTION

Figure 1:
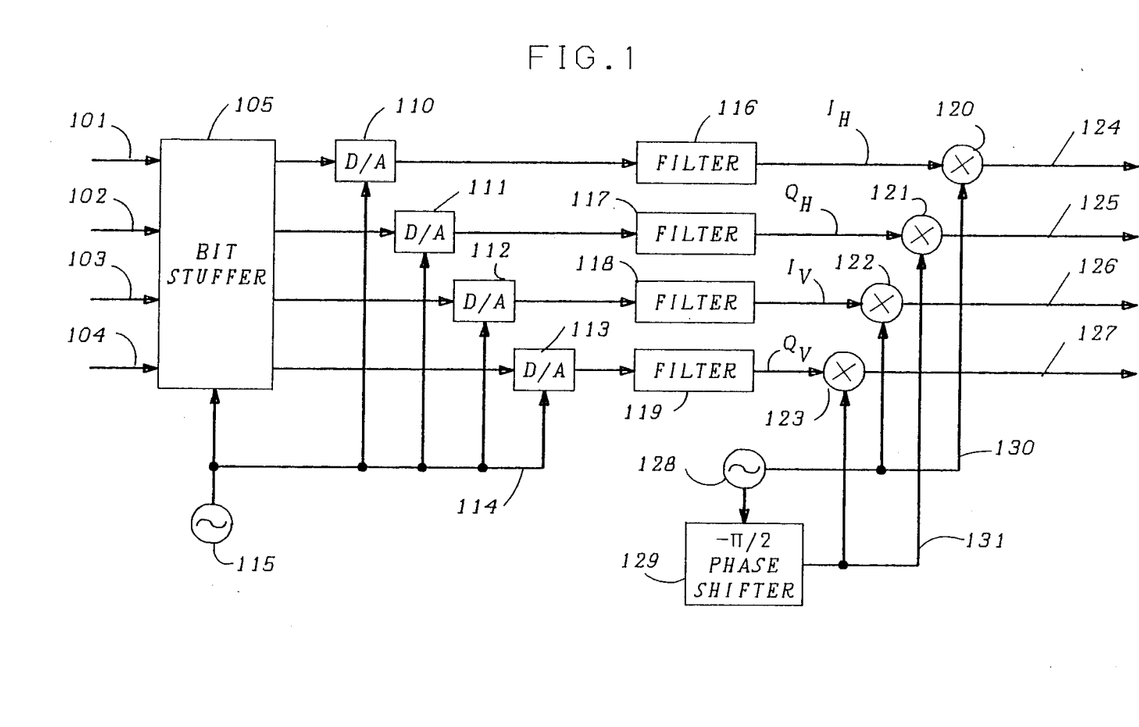
FIG. 1 is a block-schematic diagram of a transmitter which embodies the present invention.

FIG. 1 shows the transmitting end of an illustrative communications system which transmits carrier signals on dual polarizations. As shown in FIG. 1, data signals on leads 101, 102, 103 and 104 are respectively coupled through bit stuffer 105 whicn ensures that each of the data signals is synchronized with respect to a common clock. This common clock is generated by oscillator 115 and is coupled to stuffer 105 via lead 114. Digital-to-analog converters 110, 111, 112 and 113, each strobed by the clock signal on lead 114, quantize their supplied data signal into a finite number of predetermined signal voltages. These signal voltages are the permissible transmitted digital signal values. The resulting waveforms created by converters 110–113 are then spectrally shaped by half-Nyquist filters 116–119. Of course, filters which provide more arbitrary spectral shaping could be utilized.

We shall refer to the spectrally shaped waveforms respectively provided by filters 116 and 117 as the in-phase (I) rail and quadrature (Q) rails. These rails will be transmitted on carriers having a first polarization which we shall arbitrarily designate as the horizontal (H). Similarly, we shall also designate the shaped waveform provided by filter 118 as I and that provided by filter 119 as Q. These rails, however, will be transmitted on carrier signals having a second polarization which is orthogonal to the first. This second polarization will be designated as the vertical (V). To differentiate between the two I and two Q rails, subscripts shall be used to indicate the polarization. Multipliers 120 and 121 respectively modulate the amplitudes of a pair of quadrature-related carrier signals on leads 130 and 131 with $I_H$ and $Q_H$. In similar fashion, multipliers 122 and 123 modulate the amplitudes of the quadrature-related carrier signals on leads 130 and 131 with $I_V$ and $Q_V$. The modulated carrier signals are then coupled to one or more transmitting antennas (not shown) from which the carrier signals on leads 124 and 125 propagate in free space on the H polarization while the carrier signals on leads 126 and 127 propagate in free space on the V polarization. In certain applications, "upconverters" (not shown) are disposed between the modulated carrier signals and the transmitting antennas to frequency translate the "intermediate" frequency (IF) of oscillator 115 to some preselected radio frequency. It should be noted that the use of the same oscillator and phase shifter for all four carrier signals creates redundancy in H and V polarized transmitted signals in so far as carrier recovery is concerned. In addition, there is redundancy with respect to timing information in both the H and V polarizations due to the use of bit stuffer 105 and the common clock signal on lead 114. As will be discussed, this redundancy is utilized by the present invention to minimize the loss of synchronization in the timing and carrier recovery receiver circuitry.

Figure 2:
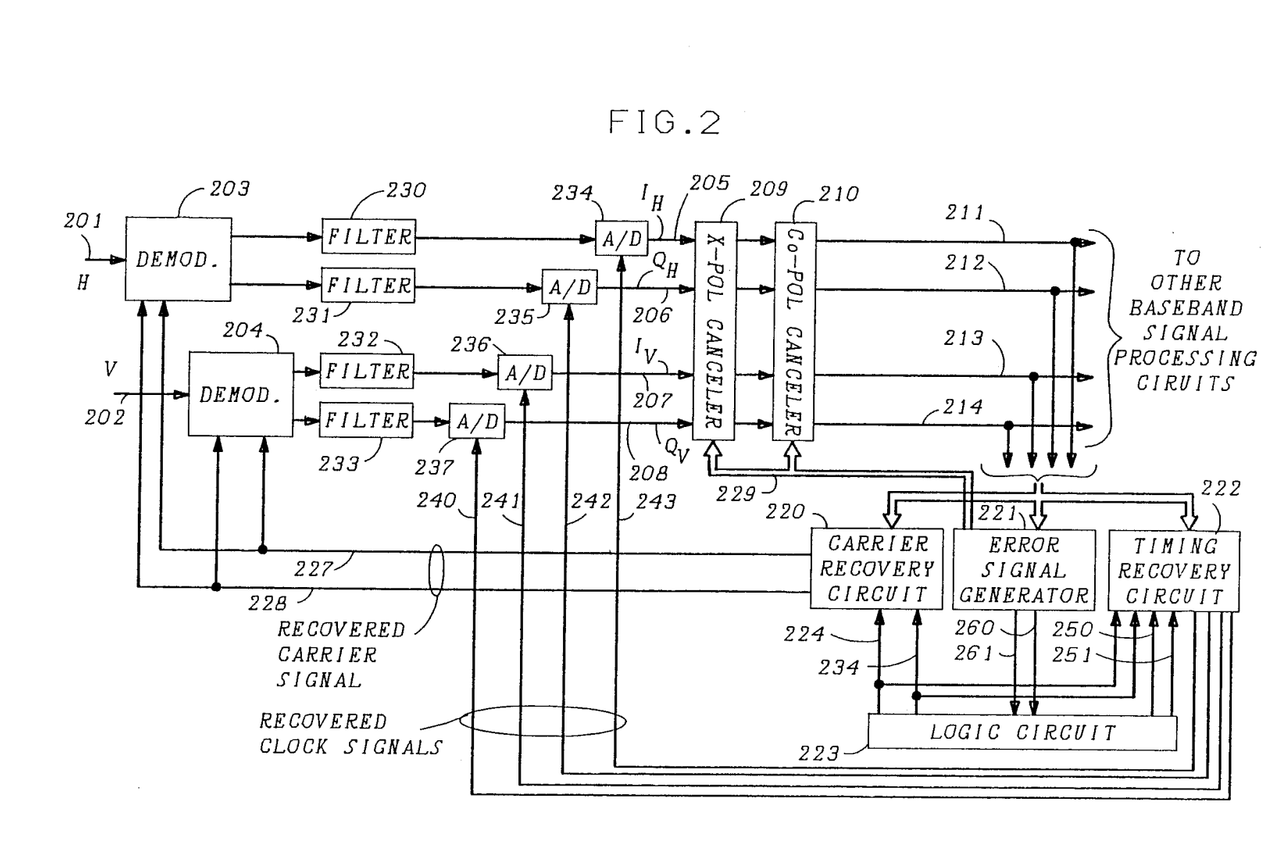
FIG. 2 is a block-schematic diagram of a receiver which embodies the present invention for use with baseband timing and carrier recovery circuits.

Refer now to FIG. 2. After propagating through the transmission channel, the H and V polarized modulated carrier signals are coupled from their respective receiving antennas (not shown) to leads 201 and 202. Demodulators 203 and 204 extract information-bearing analog signals from the received carrier signals using locally-generated carrier signals on leads 227 and 228 which are supplied by carrier recovery circuit 220. Half-Nyquist filters 230 and 231 then spectrally shape the analog signals produced by demodulator 203 before they are coupled to A/D converters 234 and 235. Half-Nyquist filters 232 and 233 provide similar spectral shaping to the signals from demodulator 204 and then couple these signals to A/D converters 236 and 237. A/D converters 234–237, are each strobed by an associated clock signal supplied by timing recovery circuit 222 on leads 240–243. Due to presence of distortion in the transmission channel, these converters typically produce distorted samples of $I_H$, $Q_H$, $I_V$ and $Q_V$ on each clock pulse. Cross-polarization canceller 209 and copolarization cancellers 210, utilizing error signals produced by error signal generator 221, remove the distortion in these samples so as to yield substantially distortion-free $I_H$, $Q_H$, $I_V$ and $Q_V$ samples and buses 211–214, respectively during proper receiver operation.

As will be shown, the present invention makes use of the redundancy in carrier and timing information in the orthogonally polarized carrier signals to reduce the likelihood that carrier recovery circuit 220 and timing recovery circuit 222 will have to reacquire synchronous operation. This benefit accrues from the fact that it is not likely that the fading will simultaneously affect both polarizations of the transmitted modulated carrier signals. In accordance with the present invention, circuitry is provided in the receiver which examines the data signals recovered from both polarizations and derives error signals associated with each polarization. The data signals from the polarization whose error signal meets a preselected criterion is then used by timing and carrier recovery circuitry to generate timing and local carrier signals which, in turn, are used to recover subsequent data signals from both polarized carrier signals. In one arrangement, the data signals are selected from one polarization so long as the associated error signal does not exceed a predetermined threshold. In another arrangement, the data signals are selected from the polarization having the smallest associated error signal. In either event, selection of the data signals used by the timing and carrier recovery circuits ensures synchronous operation of these circuits unless transmission channel distortion substantially affects both polarizations simultaneously.

The data signals on leads 211–214 are coupled to error signal generator 221, carrier recovery circuit 220 and timing recovery circuit 222. Error signal generator 221 forms an error signal each clock signal period for each data signal. This error signal is equal to the difference between the associated data signal and the closest one of the plurality of permissible transmitted digital signal values. These error signals appear on bus 229 wherein they are coupled to X-pol canceler 209, co-pol canceler 210. Cancelers 209 and 210 use the error signals, in well-known fashion, to update the tap-weight coefficients therein so that the compensation provided tracks the X-pol and co-pol distortion in the transmission channel. Error signal generator 221 also combines the error signals associated with data signals extracted from the same carrier signal to produce a pair of error signals, one associated with each of carrier signals. This pair of error signals is coupled via leads 260 and 261 to logic circuit 223 wherein they are examined to determine whether the data signal from the H-pol or V-pol carrier signals will be used by carrier recovery circuit 220 to generate the local quadrature-related carrier signals on leads 227 and 228, and by timing recovery circuit 222 to generate the clock signals on leads 240–243.

Figure 3:
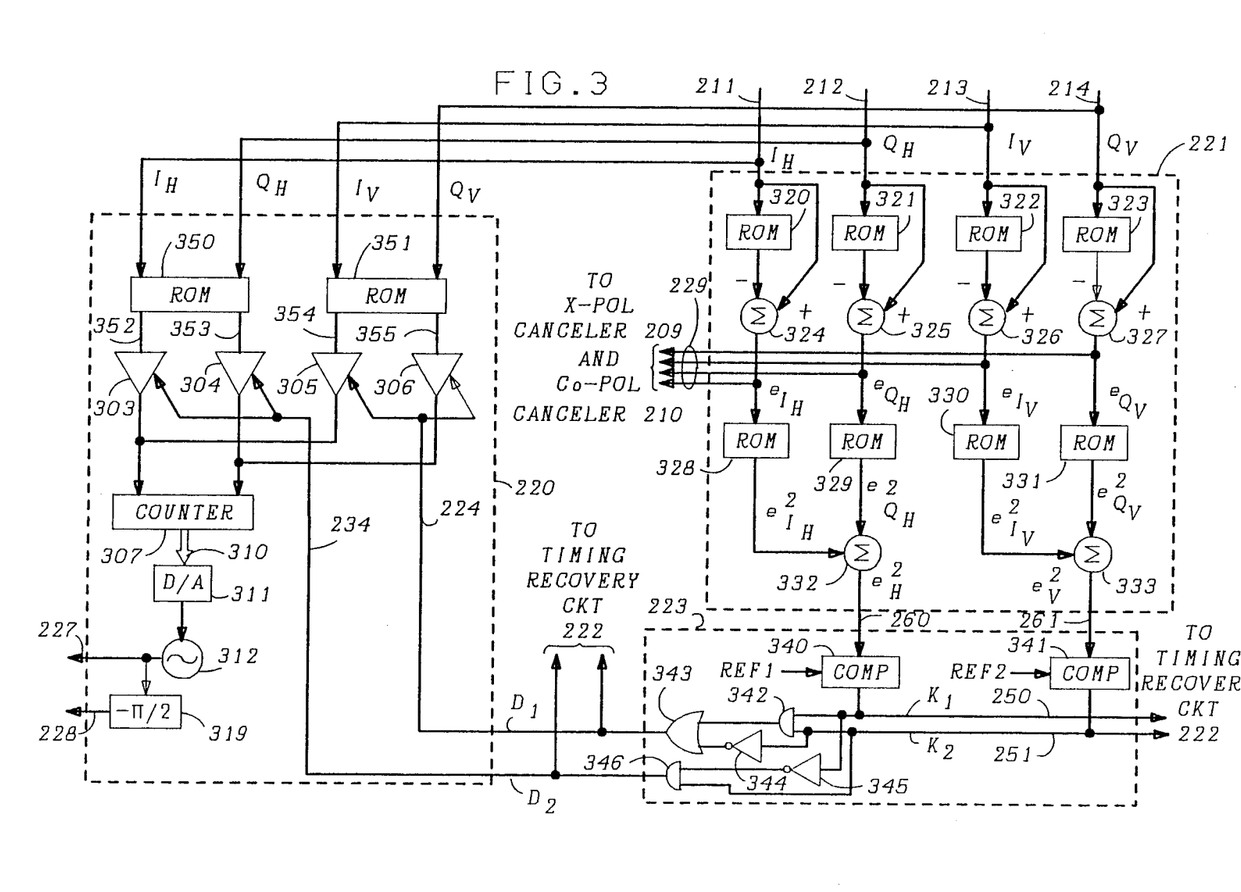
FIG. 3 is a detailed schematic diagram of error signal generator 221, logic circuit 223 and carrier recovery circuits 220 of FIG. 2.

As shown in FIG. 3, error signal generator 221 includes ROMS 320–323 and summers 324–327. Each ROM receives a different one of the data signals on leads 211–214 and maps this data signal into the closest one of the permissible transmitted digital signal values. The output of each ROM is then coupled to a different summer which forms an error signal. Each error signal is equal to the difrerence between the data signal coupled to a ROM and its mapped ROM output. In this manner, summers 324–327 respectively generate error signal $e_{IH}$, $e_{QH}$, $e_{IV}$, $e_{QV}$, wherein the subscript indicates the data signal from which the error signal was derived. These error signals are coupled to X-poi canceler 209 and co-pol canceler 210 via bus 229.

The four error signals generated by summers 324–327 are also coupled to ROMS 328–331. ROMS 328 and 329 respectively receive $e_{IH}$ and $e_{QH}$ and output the algebraic square of each error signal. Summer 332 then adds these ROM outputs to form an error signal on lead 260 associated with the H-pol carrier signal and designated as $e_H{}^2$. Similarly, ROMS 330 and 331 respectively form the algebraic square of $e_{IV}$ and $e_{QV}$ pk which are then added by summer 333 to form an error signal on lead 261 associated with the V-pol carrier signal and designated as $e_V{}^2$.

Error signals and $e_H{}^2$ and $e_V{}^2$ are supplied to logic circuit 223 where comparators 340 and 341 respectively compare tnese error signals to corresponding reference signals REF1 and REF2. While these reference signals are typically the same, they need not be so. Eacn of these reference levels represents the maximum acceptable error signal magnitude. Comparators 340 and 341 respectively generate logic signals $K_1$ and $K_2$ on leads 250 and 251 which are coupled to timing recovery circuit 222. Each of these logic signals are equal to logic "1" when their associated error signal is greater than its reference level and is logic "0" at other times. Logic signals $K_1$ and $K_2$ are also coupled through AND gates 342, 346, OR gate 343 and inverters 344 and 345 which form logic signals $D_1$ and $D_2$ on leads 224 and 234. Signals $D_1$ and $D_2$ can be expressed as:

$$D_1 = K_1 K_2 + K_2; \text{ and}$$

$$D_2 = K_1 K_2;$$

where multiplication and addition respectively indicate the Boolean algebraic AND and OR operations, and a line over a symbol indicates the inversion of that symbol.

As will be shown, signals $D_1$, $D_2$, $K_1$, and $K_2$ are used to select the data signals on leads 211-214 processed by carrier recovery circuit 220 and timing recovery circuit 222.

Within carrier recovery circuit 220, data signals $I_H$ and $Q_H$ address ROM 350 while data signals $I_V$ and $Q_V$ address ROM 351. To save memory size, these ROMS can be addressed by a portion of the bits of each data signal which is sufficient to determine the data signal value. ROM 350 produces a pulse on leads 352 or 353 depending on the bits comprising IH and QH and ROM 351 produces a pulse on leads 354 or 355 based on the bits comprising $I_V$ and $Q_V$. These pulses are coupled to tristate gates 303-306 which couple their input signals to counter 307 when the associated control signal on leads 224 or 234 is logic "0" and provide an open circuit when this control signal is logic "1". Accordingly, either the signal pulses from ROM 350 or ROM 351 are connected to counter 307. Pulses on leads 352 or 354 increment the count of counter 307 by one while pulses on leads 353 or 355 decrement the count of counter 307 by one. Bus 310 couples the current count through D/A converter 311 to oscillator 312 where the analog representation of the count, provided by converter 311, drives local quadrature-related carrier signals on leads 227 and 228 into phase alignment with the incoming modulated carrier signals. One of these local quadrature-related carrier signals appears at the output of oscillator 312 and the other is formed by coupling the output of oscillator 312 through $-\pi/2$-phase shifter 319.

Figure 4:
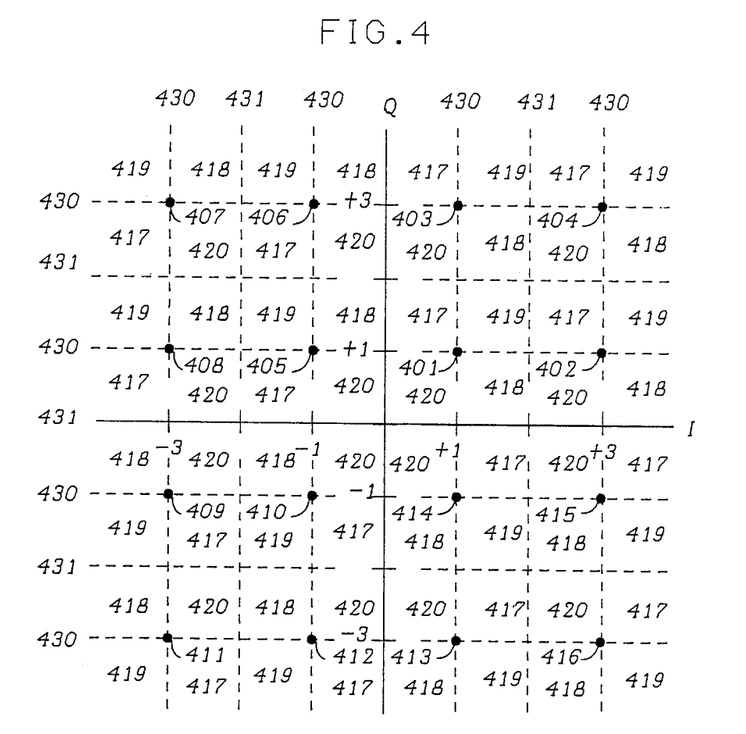
FIG. 4 is a signal constellation diagram which explains the operation of timing recovery circuit 222.

To understand how carrier recovery circuit 220 provides local quadrature-related carrier signals which are phase-aligned to the incoming carriers, refer now to FIG. 4.

FIG. 4 shows an illustrative 16 QAM signal constellation in which the permissible transmitted signal values in both the I and Q rail are $\pm 1$ and $\pm 3$. The 16 resulting data points are designated as 401-416. By choosing thresholds 430 passing through each data point and thresholds 431 crossing midway between each data point and its immediate neighbors, the 4 qaudrants of FIG. 4 can be divided into 64 quadrants as shown. Consider now the effects of phase error. The lack of phase alignment between the local quadrature-related carriers and the incoming carriers causes a rotation of the signal constellation. When the misalignment is in a first direction, the data points fall in quadrants 417 but when the phase misalignment is in the opposite direction the data points fall in quadrants 418. The appearance of the data points in quadrants 419 and 420 provide no useful information about phase alignment and these occurrences are ignored.

In view of FIG. 4, ROMS 350 and 351 in FIG. 3 map their supplied data signals into a pulse appearing on leads 352 or 354 which increments the count of counter 307 by one when the received data signals fall in quadrants 417 and a signal pulse on leads 353 and 355 which decrements the count of counter 307 by 1 when the received data signals fall in quadrants 418. Oscillator 312 and phase shifter 319, in turn, varies the phase of the local quadrature-related carrier signals on leads 227 and 228 relative to the incoming carriers in response to the analog representation of the count of counter 307.

Figure 5:
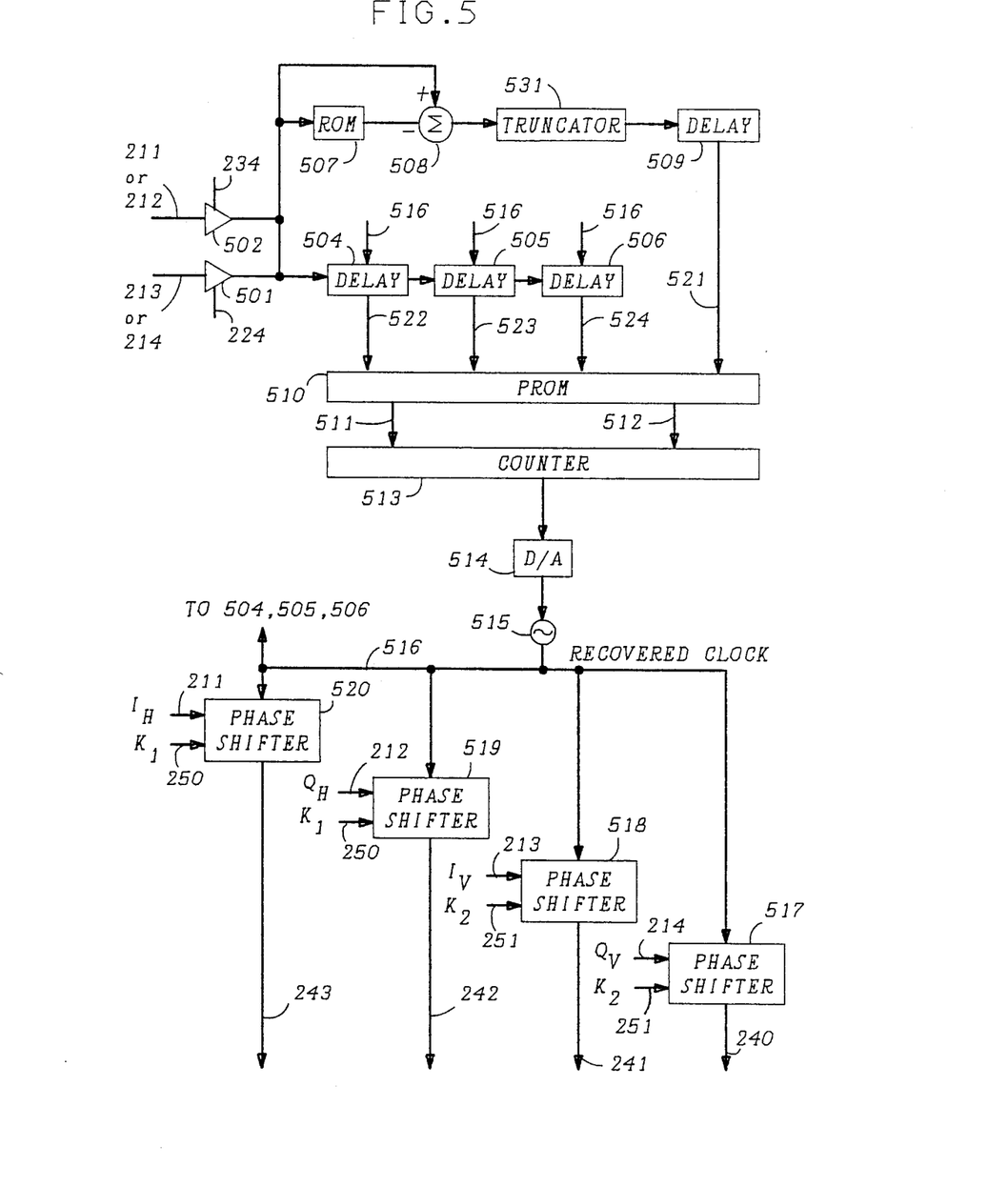
FIG. 5 is a block-schematic diagram of timing recovery circuit 222 of FIG. 2.

FIG. 5 shows the circuitry within timing recovery circuit 222 for generating the clock signal on leads 240-243 in FIG. 2. One data signal from the H-pol carrier signal on buses 211 or 212 and one data signal from the V-pol carrier signal on buses 213 or 214 are coupled through tristate gates 501 and 502 to a shift register comprising delay elements 504-506. Gates 501 and 502 are respectively controlled by the logic signals on leads 234 and 224 in the same manner as the tristate gates in carrier recovery circuit 220 so that an H or V -pol data signal, depending on the magnitude of $e_H^2$ and $e_V^2$, is coupled to delay elements 504-506. Each of these delay elements is a parallel-in, parallel-out device which, clocked by the signal on lead 516, provides a delay of one symbol period. Gates 501 and 502 also selectively couple the data signal to ROM 507 which quantizes each received signal into the closest one of the permissible data signal values. Summer 508 subtracts this quantized value from the associated received data signal to form an error signal. This error signal is coupled to truncator 531 which is a digital magnitude comparator that outputs a logic "0" when the polarity of the error signal is positive and a logic "1" when this polarity is negative. The output of truncator 531 passes through delay element 509 and appears on lead 521 as part of the address for PROM 510. The balance of this address is the outputs from the shift register delay elements appearing on buses 522, 523 and 524. Delay element 509 is needed to ensure that the error signal appears on lead 521 when the associated data signal, i.e., the data signal from which the error signal was derived, appears on bus 523.

PROM 510, addressed by the bits of three consecutive data signals and a representation of the error signal polarity, outputs a logic signal on leads 511 or 512 in response to certain addresses which respectively increments or decrements the count stored in counter 513 by one. These certain addresses correspond to times when the bits of the three consecutive data signals from delay elements 504-506 indicate the data signals are successively increasing or decreasing. If this is not the case, PROM 510 does not change the count stored in counter 513. Specifically, PROM 510 is programmed to increment the count by one when the bits of the three consecutive data signals indicate the data signals are successively increasing and the error signal polarity is positive, i.e., a logic "0" signal on lead 521, or when the error signal polarity is negative, i.e., a logic "1" on lead 521 and the bits indicate the three data signals are successively decreasing. Similarly, PROM 510 decrements the count in counter 513 by one when the bits from delay elements 504-506 indicate the data signals are successively increasing and the polarity of the error signal is negative or when the polarity of the error signal is positive and the bits from delay elements 504-506 indicate the three data signals are successively decreasing. This operation of PROM 510 will drive oscillator 515 into phase lock with oscillator 115 of FIG. 1.

The count stored in counter 513, after being converted into an analog waveform by A/D converter 514, is coupled to oscillator 515 wn:ch, in response thereto, increases or decreases its phase relative to oscillator 115. The output of oscillator 515 on lead 516 is a clock signal which is phase and frequency locked to the clock signal on lead 114 of FIG. 1 which is the clock rate of the incoming data signals. However, since the H and V-pol carrier signals can propagate to the receiver over different paths, a fixed phase offset can exist between the clock signal on lead 516 and the optimum sampling times for each of the data signals not processed by PROM 510. Therefore, the clock signal on lead 516 is coupled in parallel through four identical phase shifters 517 through 520 to respectively derive clock signals on leads 240-243 which occur at the optimum sampling times. Each of these phase shifters is supplied with a corresponding one of the data signals and a corresponding one of the logic signals from leads 250 or 251.

Figure 6:
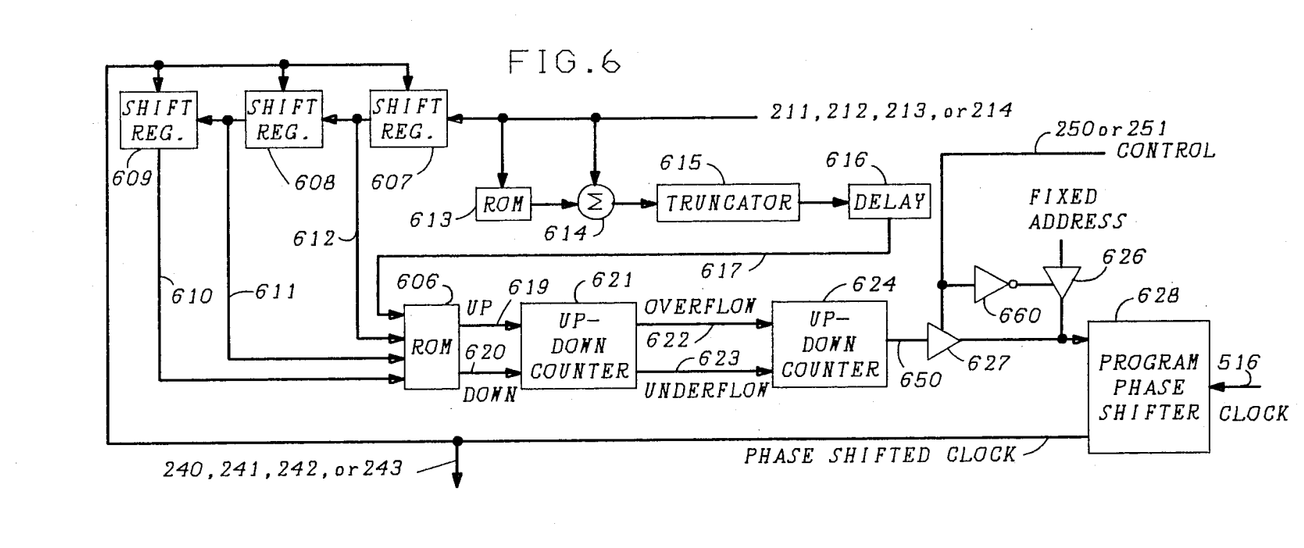
FIG. 6 is a block-schematic diagram of phase shifter 517, 518, 519 or 520 within timing recovery circuit 222.

FIG. 6 shows the circuitry within each of the phase shifters 517 through 520. As discussed, the data signal on buses 211, 212, 213 and 214 are respectively coupled to phase shifters 517-520. Within each phase shifter, as illustrated in FIG. 6, the supplied data signal is coupled to parallel-in, parallel-out shift registers 607-609 which are strobed by the corresponding phase shifted clock signal on leads 240, 241, 242 or 243. This supplied data signal is also coupled through circuitry including ROM 613, summer 614, truncator 615 and delay element 616 so as to produce on lead 617 a digital representation of the polarity of the error signal generated by summer 614. This circuitry operates in the same manner as ROM 507, summer 508, truncator 531 and delay element 509 in FIG. 5. PROM 606, supplied with the signal on lead 617 and the outputs of shift registers 607-609, functions in the same manner as PROM 510 of FIG. 5 to output a signal on lead 619 and 620 which respectively increments or decrements the count of counter 621. Counter 621 is designed to output an overflow signal on lead 622 and an underflow signal on lead 623 upon reaching predetermined limits. These limits can be selected to provide the desired amount of integration. The overflow and underflow signals are then coupled to up/down counter 124 which, in turn, supplies a multibit word on bus 650 which represents the count. This word is coupled through tristate gate 627 to digitally programmable phase shifter 628. The number of bits in the multibit word on bus 650 is selected to provide the requisite phase shift sensitivity wherein the greater the number of bits the smaller the minimum phase shift change provided.

Digitally programmable phase modifier 628 alters the timing of the input clock signal on lead 516 in accordance with the multibit word on bus 650 to produce the associated phase shifted clock signal on leads 240-243. Advantageously, the phase shifter of FIG. 6 is provided with circuitry, comprising tristate gates 626 and 627 and inverter 660, which ignores the multibit word on bus 650 when the data signal supplied to the circuitry of FIG. 6 on buses 211, 212, 213 or 214 has distortion which exceeds the permissible amount. Such occurrences are indicated by a logic "1" state of signal $K_1$ for data signals $I_H$ and $Q_H$ and a logic "1" state of signal $K_2$ for $I_V$ and $Q_V$. Accordingly, when the associated logic signal on lead 250 or 251 is logic "1", tristate gate 627 proves a high impedance output which effectively disconnects programmable phase adjuster from bus 650 and inverter 660 causes tristate gate 626 to couple a fixed address to phase adjuster 628. This fixed address is selected to set the phase change provided at some nominal level so that the optimum phase shift can be readily provided after normal operation of the phase shifter of FIG. 6 is restored.

Figure 7:
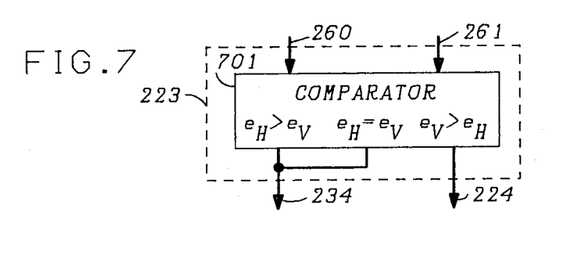
FIG. 7 is a detailed schematic of another embodiment of logic circuit 223.

In the embodiment of the present invention described hereinabove, logic circuit 223 generates logic signal $D_1$ and $D_2$ which control the data signals used by the carrier and timing recovery circuits. Specifically, the data signals extracted from a preselected one of the polarized carrier signals are selected so long as the error signal associated with this carrier signal meets a prescribed criterion. If not, the data signals extracted from the other polarized carrier signal are selected. Of course, other logic circuit arrangements are possible. For example, FIG. 7 shows another embodiment of logic circuit 223 comprising comparator 701. In this embodiment, a logic "1" signal is generated on lead 234 when $e_H^2 \geq e_V^2$ or a logic "1" signal is generated on lead 224 when $e_V^2 >> e_H^2$. As a result, the data signals used by carrier recovery circuit 220 and timing recovery circuit 222 are those extracted from the carrier signal having the smaller associated error signal.

Figure 8:
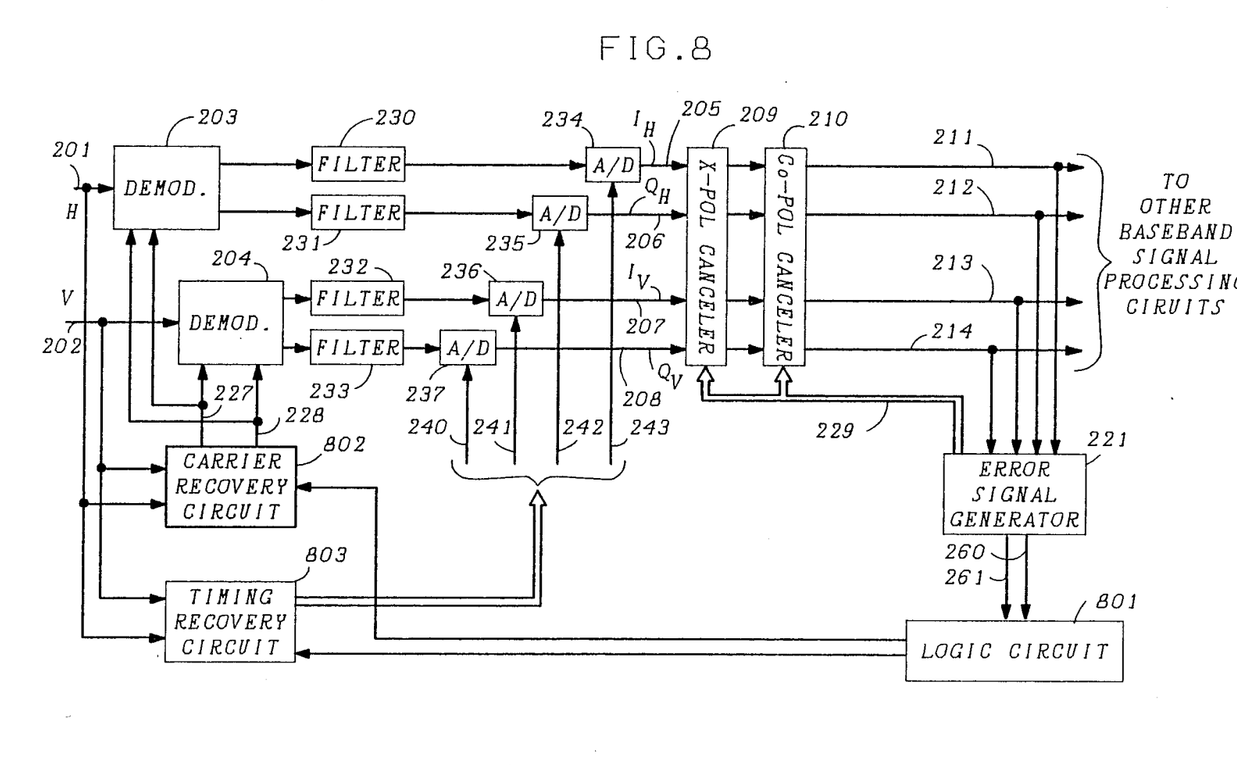
FIG. 8 is a block-schematic diagram of a receiver which incorporates the present invention for use with passband carrier and timing recovery circuits.
Figure 9:
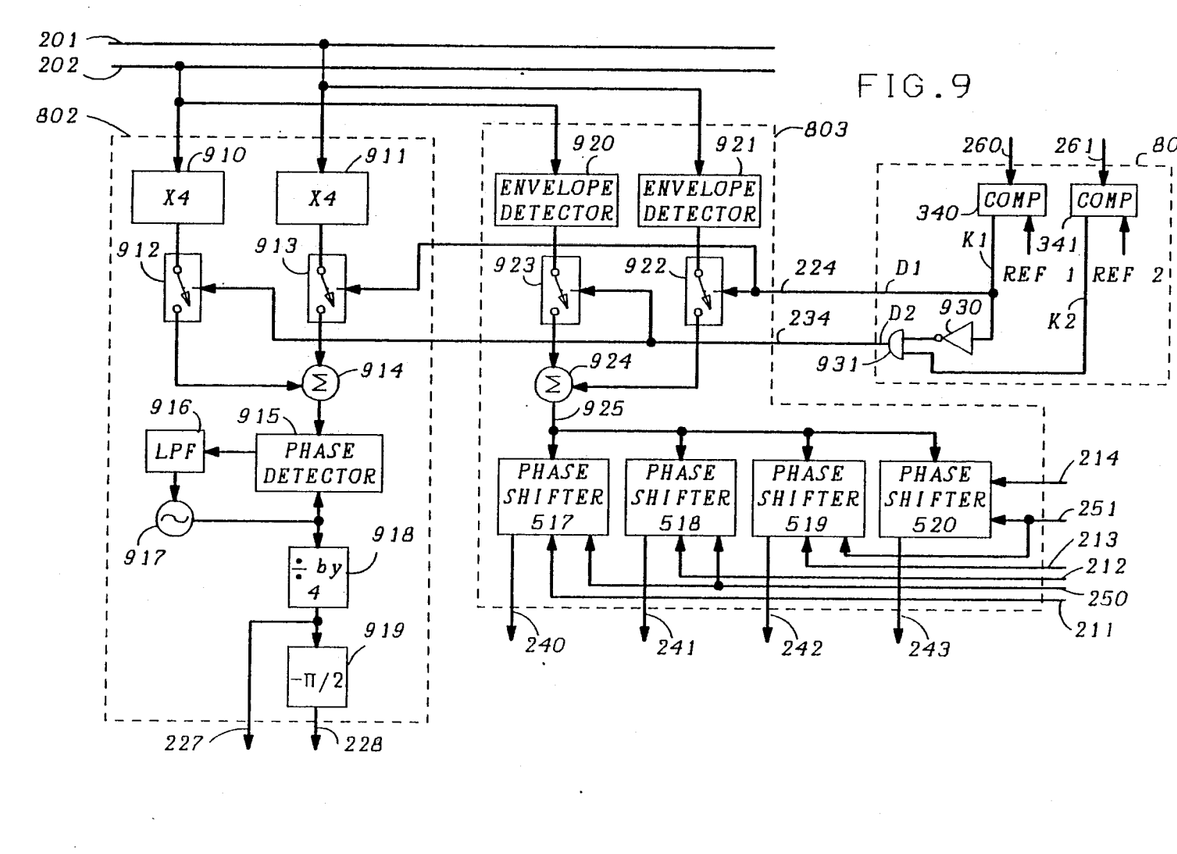
FIG. 9 is a detailed schematic of logic circuit 801 and carrier and timing recovery circuits 802 and 803, respectively, of FIG. 8.

The present invention, while disclosed thus far in reference to baseband carrier and timing recovery circuits, is also applicable to passband versions of of these circuits. Refer now to FIG. 8 which shows a block diagram of an embodiment of the present invention utilizing passband carrier and timing recovery circuits. FIG. 8 is identical in operation to FIG. 3 except for the use of a different logic circuit 801 and, of course, different carrier and timing recovery circuits which are respectively designated as 802 and 803. FIG. 9 shows the detailed schematics of these circuits. As shown in FIG. 9, logic circuit 801 comprises comparators 340 and 341, inverter 930 and AND gate 931. Comparators 340 and 341 are identical to those in FIG. 3 and function in the same manner to generate logic signals $K_1$ and $K_2$ and $e_H^2$ and $e_V^2$. Inverter 930 and AND gate 931 are arranged to generate control signals $D_1$ and $D_2$ from $K_1$ and $K_2$, such that $$D_1 = K_1; \text{ and}$$

$$D_2 = \overline{K_1}K_2;$$

wherein multiplication indicates a Boolean AND operation and a line over a symbol indicates the inverse of that symbol.

Carrier recovery circuit 802 includes two multipliers 910 and 911 which respectively multiply the H and V-pol carrier signals by 4 so as to generate a tone at 4 times the frequency of oscillator 128 of FIG. 1. This operation is required because the signals on leads 201 and 202 are each a suppressed carrier double-sideband signal. Switches 912 and 913, respectively under the control of logic signal $D_1$ and $D_2$, selectively couple the outputs of multiplier 910 and 911 to summer 914. Accordingly, summer 914 receives the H and V-pol carrier signals, each multiplied by 4, when the error signal associated with the H-pol carrier signal is less than REF2 and the error signal associated with the V-pol carrier signal is less than REF1. Forming this sum advantageously increases the signal-to-noise ratio by 3 dB and thereby improves the jitter performance of carrier recovery circuit 802.

The output of summer 914 is supplied to phase detector 915 which is arranged in a loop with oscillator 917 and low pass filter 916 to generate a local carrier signal at 4 times that of oscillator 128. This carrier signal is then frequency translated by divide by 4 circuit 918 and coupled through a $-\pi/2$ phase shifter to generate a pair of quadrature-related carrier signals on leads 227 and 228 which are phase and frequency locked to the incoming carrier signals on leads 201 and 202.

Timing recovery circuit 803 comprises envelope detector 920 and 921 which respectively receive the H and V-pol carrier signals. The detected carrier signal envelopes, in turn, are coupled through switches 922 and 923 to summer 924. Switches 922 and 923 operate in response to logic signals $D_1$ and $D_2$ in the same fashion as switches 912 and 913. Summer 924 provides the same advantage as summer 914 in carrier recovery circuit 802. The recovered clock signal, which is frequency locked to the data signals within each of the incoming carriers, appears on lead 925. As the carrier signals can propagate over substantially different length paths to the receiver, this clock signal is coupled to phase shifters 517-520, which operate as described in FIG. 5, to generate 4 phase locked clock signals on leads 240-243 at the optimum sampling times.

It should, of course, be understood that while the present invention has been disclosed with reference to two specific embodiments, numerous other arrangements may be apparent to those skilled in the art without departing from the spirit and scope of the present invention. First, the present invention is applicable to a variety of different modulation formats, such as quadrature amplitude modulation (QAM), phase shift keying (PSK) or frequency shift keying (FSK), used in dual polarization communications systems. Moreover, while such systems utilize two quadrature-related carrier signals in each polarization, the present invention can be applied so long as there is one carrier signal in each polarization. Second, while both carrier and timing recovery have been altered by the present invention, either one alone can be altered where appropriate. This can arise, for example, in modulation formats such as frequency shift keying where carrier recovery is not necessary.

What is claimed is:

1. Receiver apparatus for use in a communications system which transmits digital data signals each capable of having a plurality of transmitted values, said digital data signals being transmitted on carrier signals having polarizations which are orthogonal to one another and said carrier signals being processed to recover said data signals, said apparatus comprising
   means for examining the data signals recovered from each of said orthogonal carrier signals at a particular time, said examining means providing different results based on the values of said recovered data signals at said particular time; and
   means, responsive to one of said carrier signals and not the other when said examining means provides a first result, for controlling the recovery of said data signals from each of said carrier signals subsequent to said particular time.

2. The apparatus of claim 1 wherein said controlling means is responsive to at least one data signal recovered from said one of said carrier signals when said examining means provides a first result.

3. The apparatus of claim 1 wherein said controlling means generates local carrier and clock signals.

4. The apparatus of claim 2 wherein said controlling means generates local carrier and clock signals.

5. The apparatus of claim 1 wherein said examing means generates error signals, each error signal being equal to the difference between the value of an associated data signal and a prescribed one of the plurality of transmitted values.

6. The apparatus of claim 5 wherein said examining means combines said error signals associated with the data signals recovered from the same carrier signal to form second error signals.

7. The apparatus of claim 6 wherein said one of said carrier signals has an associated second error signal which meets a predetermined criteria.

8. The apparatus of claim 6 wherein said one of said carrier signals has an associated second error signal whose magnitude is the smallest of the second error signals.

9. The apparatus of claim 1 wherein said controlling means is responsive to a combination of said orthogonal carrier signals when said examining means provides a second result.

10. The apparatus of claim 7 wherein said controlling means is responsive to a combination of said orthogonal carrier signals when said examining means provides a second result.

11. The apparatus of claim 10 wherein said second result corresponds to each of said second error signals meeting respective predetermined criteria.

12. A communications system wherein digital data signals each having a plurality of values are transmitted on carrier signals having orthogonal polarizations, said system having a transmitter comprising
    means for inserting bits into said digital data signals to ensure said digital data signals are synchronous with respect to one another;
    means for deriving said orthogonal carrier signals from a common source; and
    means for modulating said derived orthogonally polarized carrier signals with the synchronized digital data signals;
    and said system having a receiver comprising
    means for processing said modulated orthogonally polarized carrier signals to recover said data signals;
    means for examining the data signals recovered from each of said orthogonally polarized carrier signals at a particular time, said examining means providing different results based on the values of said recovered data signals at said particular time; and
    means responsive to one of said carrier signals and not the other when said examining means provides a first result for controlling the recovery of said data signals from each of said carrier signals subsequent to said particular time.

* * * * *